United States Patent [19]

Powers et al.

[11] 4,182,949
[45] Jan. 8, 1980

[54] SELF-CONTAINED, PORTABLE UNDERWATER STUD WELDER

[75] Inventors: Gaylord D. Powers; Donald G. Quist, both of Ridgecrest, Calif.

[73] Assignee: The United States of America as represented by the Secretary of the Navy, Washington, D.C.

[21] Appl. No.: 922,954

[22] Filed: Jul. 10, 1978

Related U.S. Application Data

[63] Continuation-in-part of Ser. No. 707,471, Jul. 21, 1976, abandoned.

[51] Int. Cl.² ............................................. B23K 9/20
[52] U.S. Cl. .................................... 219/98; 219/113; 320/1
[58] Field of Search ......................... 219/98, 99, 113; 315/242, 243, 244, 289, 290; 320/1

[56] References Cited

U.S. PATENT DOCUMENTS

| 2,307,026 | 1/1943 | Crecca | 219/98 |
|---|---|---|---|
| 2,315,502 | 4/1943 | Crecca et al. | 219/98 |
| 2,474,531 | 6/1949 | Keir et al. | 219/98 |
| 3,263,099 | 7/1966 | Bedford | 307/109 |
| 3,352,996 | 11/1967 | Neumeier | 219/98 |
| 3,423,558 | 1/1969 | Brennen | 219/98 |
| 3,423,560 | 1/1969 | Brennen | 219/98 |
| 3,505,495 | 4/1970 | Mitchell | 219/99 |
| 3,526,741 | 9/1970 | Glorioso | 219/98 |
| 3,696,227 | 10/1972 | Wenrich et al. | 219/99 |
| 3,706,022 | 12/1972 | Corey et al. | 320/1 |
| 3,788,228 | 1/1974 | Wilson | 102/70.2 R |
| 3,838,786 | 10/1974 | Bachman et al. | 219/98 |
| 3,869,361 | 3/1975 | Jenkins | 219/98 |
| 3,909,694 | 9/1975 | Yokota et al. | 219/98 |
| 3,989,920 | 11/1976 | Masubuchi et al. | 219/98 |

OTHER PUBLICATIONS

Taylor Lyman, Ed., *Metals Handbook*, vol. 6, Welding & Brazing, 5/1974, p. 168.

*Primary Examiner*—Bruce A. Reynolds
*Assistant Examiner*—Clifford C. Shaw
*Attorney, Agent, or Firm*—R. S. Sciascia; W. Thom Skeer; T. R. Schulte

[57] ABSTRACT

A self-contained, portable, underwater stud welder includes a hand-held welding gun and a battery powered backpack. The welder uses a bank of rechargeable nickel-cadmium batteries which charges a storage inductor, the energy of the inductor being transferred to a bank of capacitors, providing a high efficiency method of charging the capacitor bank so the battery bank is kept small.

7 Claims, 6 Drawing Figures

SELF-CONTAINED, PORTABLE UNDERWATER STUD WELDER

CROSS REFERENCE TO RELATED APPLICATION

This application is a continuation-in-part of Applicant's copending application, Ser. No. 707,471, filed on 21 July 1976, now abandoned.

BACKGROUND OF THE INVENTION

1. Field of the Invention

The present invention relates to stud welding devices and, more particularly, to a self-contained, portable, capacitor discharge stud welding device having a highly efficient energy transfer mechanism and capable of underwater use.

2. Description of the Prior Art

Conventional stud welders are powered by commercial power lines or by electric generating equipment. Therefore, although the welder and its associated equipment may be portable, it is not self-contained and requires an outside source of electrical power. This necessitates power supply cables which limit the mobility of the operator if used underwater. These cables may also become entangled with diving gear. The outside power supply may also present a problem if it is desired that the diver be undetected, such as in underwater demolition work involving structures controlled by a hostile power.

Conventional stud welders use electrical power, usually in the form of 100–120 volt ac, to charge a capacitor bank to approximately 150–200 volts by means of voltage doubler circuits, the charging occurring through a limiting resistor which dissipates some of the electrical energy as heat. This type of energy transfer mechanism reduces the efficiency of the energy transfer to the capacitor.

A capacitor charging circuit of this type is shown in U.S. Pat. No. 3,706,022 issued to E. E. Corey et al. on 12 Dec. 1972. That device utilizes taps on the primary winding of an output transformer. By using a time delay to switch the taps from maximum primary to secondary winding ratios to consecutively lower winding ratios, a capacitor is charged in incremental steps. The capacitor is charged through a diode bridge rectifier and a limiting resistor. While satisfactory for its intended purpose, such as in photoflash devices, the circuit requires a limiting resistor which, in turn necessitates a larger power supply to achieve the desired charge. The device is, therefore, less acceptable for situations, such as under water use, where it is desired that the power supply be kept small, self-contained and portable.

SUMMARY OF THE INVENTION

Accordingly, the present invention provides a self-contained source of power to charge a discharge capacitor bank by means of a high efficiency energy transfer mechanism. A bank of rechargeable nickel-cadmium batteries provides the electrical power by transferring energy to a storage inductor which then transfers its energy to a storage capacitor without using resistors. The power supply and control unit is self-contained and can be strapped to an operator's back. A hand-held welding gun is attached to the container by an electrical cable which is also capable of being used as a tow cable. The welding gun has a mechanical safety mechanism to prevent danger of electrical shock to the operator when he loads the welding gun with a stud to be welded.

To initiate a charge from the batteries via the storage inductor into the storage capacitor, the operator must activate two safety interlocks. He must first load the stud and then activate the trigger safety or release switch to initiate charging. When the storage capacitor is charged, a voltage sensing circuit stops the charging mechanism and energizes an indicator light. The operator then pulls the trigger to initiate the welding cycle. The stud is driven against a work piece by a spring at the same time weld current is applied by a solid state switch. Contact of the stud with the work piece completes the electrical circuit, thereby discharging the storage capacitor and making the weld. The safety switch is returned to the safe position.

DESCRIPTION OF THE PREFERRED EMBODIMENT

Figure 1:
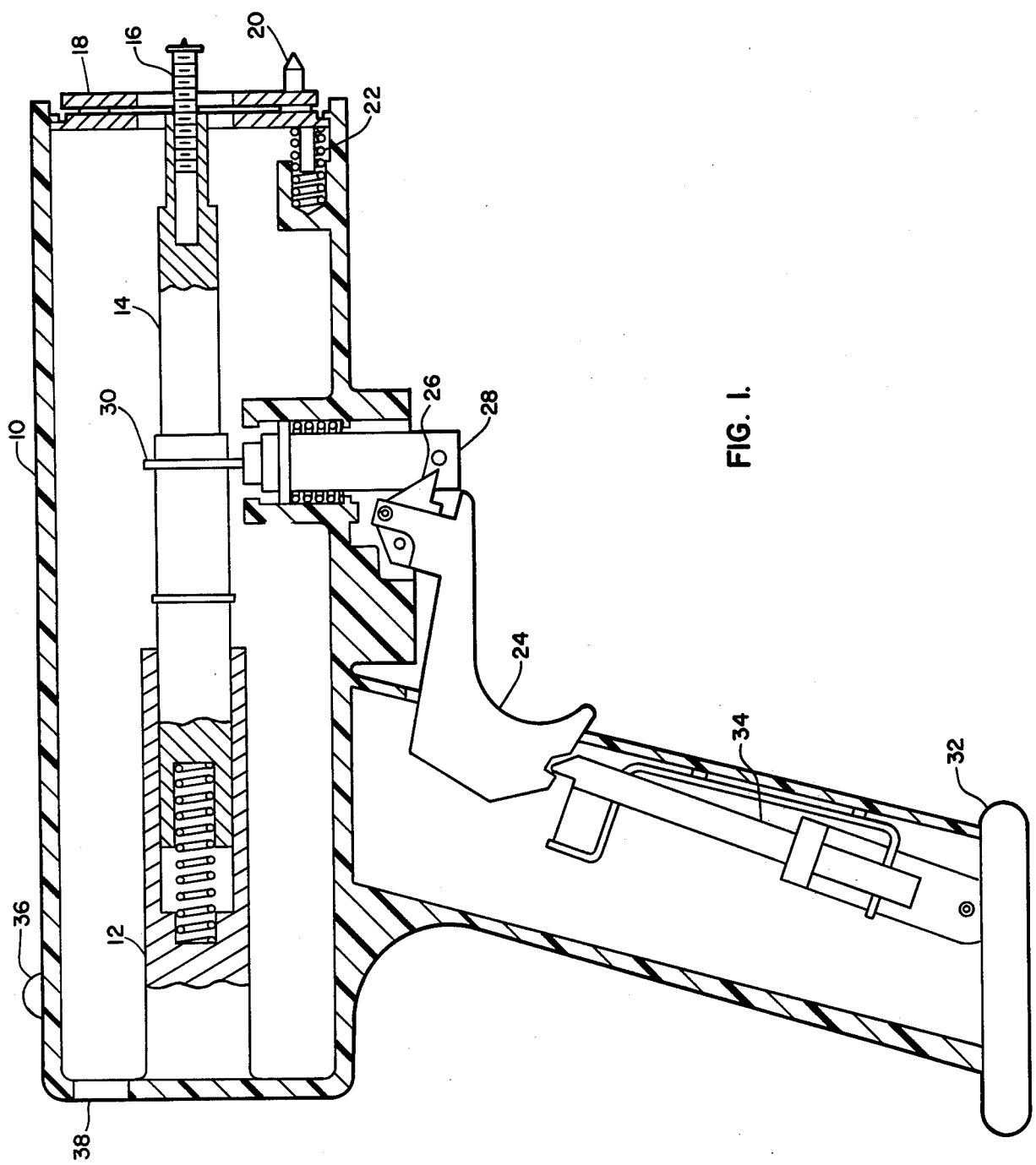
FIG. 1 is a cutaway view of a hand-held welding gun for the present invention.

Referring now to FIG. 1, a mechanical cutaway of a hand-held welding gun for a stud welder is shown. A hand-held device or case 10 is shaped like a pistol, having a bored barrel and a handle. A sleeve 12 is mounted at the interior base end of the barrel of case 10 and projects toward the muzzle end. A stud chuck 14 is spring-mounted in order to be resiliently driven so as to slide within sleeve 12 and project from sleeve 12 toward the muzzle end of case 10. A fusible stud 16 to be welded to a metal plate or other work piece (not shown) is gripped by stud chuck 14. Stud chuck 14 also has an electrical connection or wire (not shown) attached thereto. The spring, electrical connection, and stud chuck 14 combine to grip the stud, move it toward the work piece, and provide energy thereto. These elements comprise a holding means.

A ground plate 18, having a plurality of ground studs 20 attached thereto, is mounted at the muzzle end of case 10. Ground plate 18 has a central hole through which stud chuck 14 and stud 16 may pass. For illustrative purposes, only one of said ground studs 20 is shown in FIG. 1. However, the plurality of ground studs 20 mentioned herein are circumferentially mounted on ground plate 18, the mounting being more clearly seen in FIG. 2 of the alternative embodiment of the invention. A spring arrangement 22 may be attached between case 10 and ground plate 18 to provide positive contact of ground studs 20 with the work piece when welding. Ground studs 20 extend beyond the muzzle end of case 10.

A trigger 24 and trigger sear 26 are pivotally mounted to case 10 so as to be convenient to the finger of an operator when the welding gun is held. Trigger sear 26 engages a pin on a spring-loaded piston 28 so that when trigger 24 is squeezed, piston 28 is pulled down. A shoulder 30 on stud chuck 14 engages a land (not shown) on piston 28 when stud chuck 14 is pushed into sleeve 12 and piston 28 is in its upward position, i.e. stud chuck 14 is "cocked". Shoulder 30 also actuates a microswitch (not shown) to provide an electrical signal indicating the position of stud chuck 14.

A heel plate 32 at the bottom of the handle of case 10 is spring mounted by suitable means so that, when pulled out from the handle, a connecting rod 34, which has a tip formed to fit into a notch in the bottom of trigger 24, is pulled away from trigger 24. Trigger 24 is thus released after having been locked by connecting rod 34 when in the squeezed, or "safe" position. The position of the heel plate 32 and connecting rod 34, whether in the "safe" position or not, is detected by another microswitch (not shown) to provide an electrical safety-status signal. The above described apparatus thus acts as a safety means.

Figure 2:
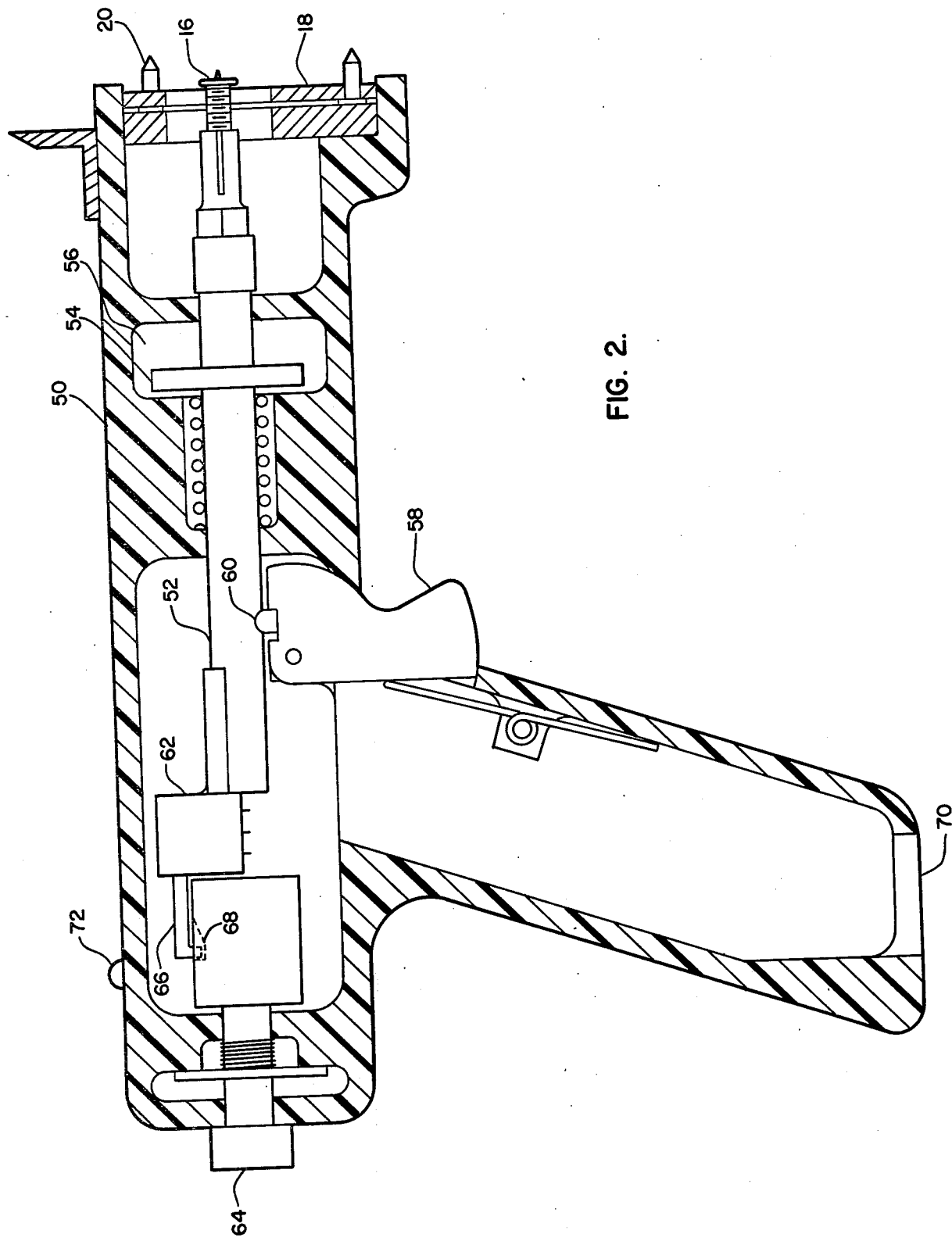
FIG. 2 is a cutaway view of another embodiment of a hand-held welding gun for the present invention.

FIG. 2 shows the mechanical layout of another hand held welding gun which embodies the concepts of this invention. A hand held device or case 50 is shaped like a pistol having a bored barrel and a handle. A stud chuck 52 is slidably mounted inside the case 50 in the barrel section so that it extends toward the muzzle end of case 50. The stud chuck 52 is spring loaded in order to be resiliently driven and is shown in the cocked position. A shoulder 54 on stud chuck 52 is located in a cavity 56 in case 50 to limit the travel of the stud chuck. A pivotally mounted trigger 58, which is also spring-loaded, has a notch which engages a land 60 on stud chuck 52 when stud chuck 52 is in the cocked position.

A microswitch box 62 is mounted on the end of stud chuck 52 opposite the muzzle end, and contains the microswitches which provide electrical position and safety signals to a power supply and a control circuit. A spring-loaded safety switch 64 is rotatably mounted in the rear of case 50. A follower arm 66, pivotally mounted on the microswitch box 62, engages a ramped groove 68 in safety switch 64 when safety switch 64 is in the charge position, as shown in FIG. 2.

An electrical cable (not shown) enters through a hole 70 in the butt of case 50, and weld power is applied between a wire (not shown) attached to ground plate 18 and an electrical connection or wire (not shown) to stud chuck 52. Control leads are connected to microswitch box 62. An indicator which may be an LED 72, mounted on top of case 50, operates as a means for indicating when the electrical power source is charged and ready for the next weld.

MODE OF OPERATION

Figure 6:
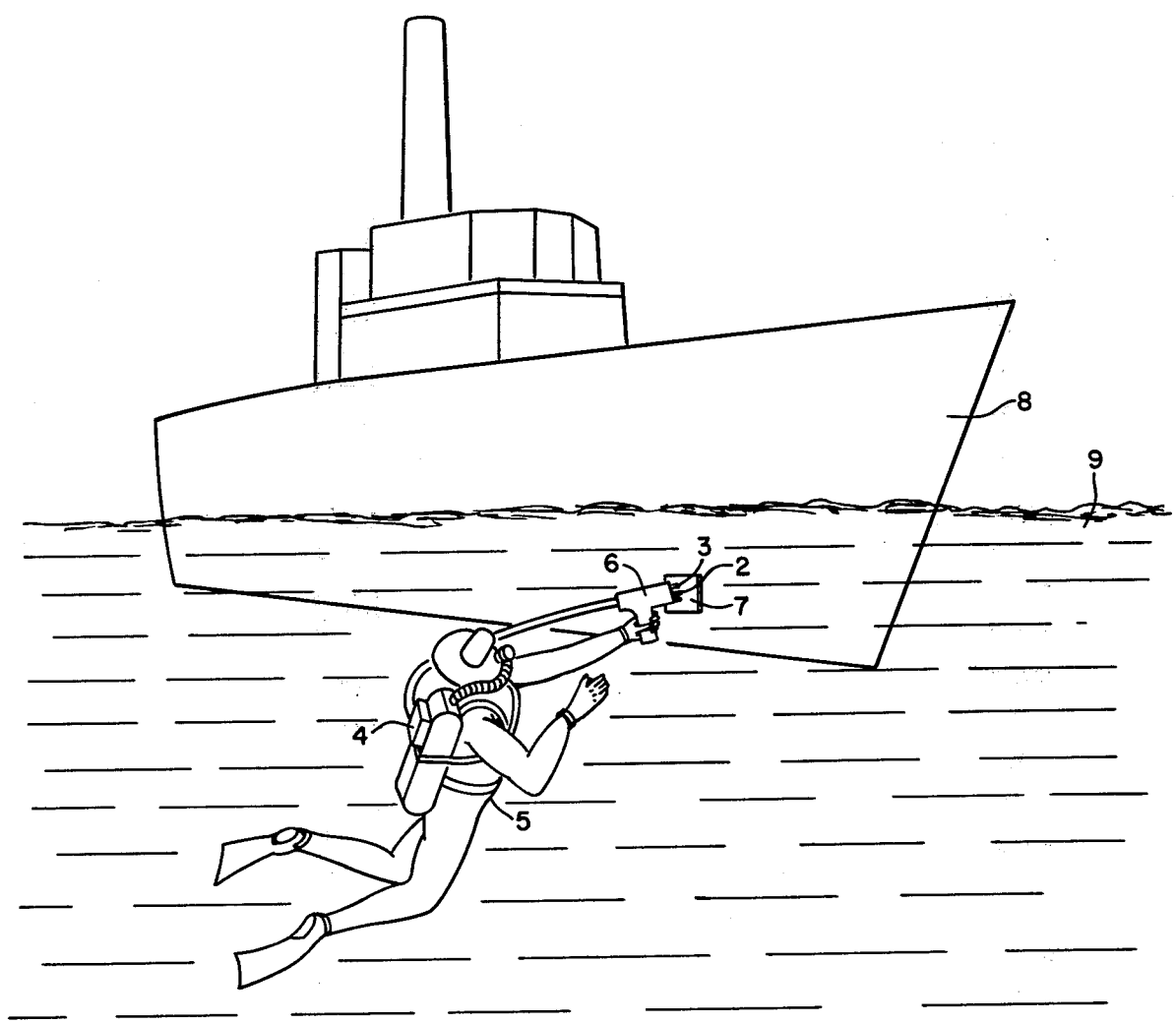
FIG. 6 shows the stud welder being used underwater.

Referring to FIG. 6, an operator 5 uses a stud welding gun 6 to weld a metal plate 7 onto the hull of a ship 8. The self contained power supply with control circuit 4 provides sufficient energy to stud welder 6 to complete the weld between fusible stud 2 and the hull of ship 8. A circumferential array of ground studs 3 contacts metal plate 7 which is to be attached to ship hull 8 in underwater environment 9. Because the welding apparatus is self-contained, no outside power supply is needed, and, thus, no cumbersome power supply lines are required from either ship 8 or, in the case of a clandestine operation, from a support vehicle which could increase the possibility of detection for operator 5.

FIG. 1 shows the welding gun in the configuration after a weld has been initiated. Trigger 24 cannot be released to initiate another weld until heel grip 32 is pulled down to disengage connecting rod 34. While in this position the source of electrical power, which was discharged during the weld, cannot be recharged and the operator can reload stud chuck 14 with another stud 16 without a shock hazard from the output potential. This system operates as a safety means.

To operate, stud 16 is loaded in stud chuck 14. Stud chuck 14 is cocked by pushing it back until shoulder 30 clears the land of piston 28. Piston 28 returns to its upward position, thus holding stud chuck 14 in the cocked position. Heel plate 32 is pulled down to release trigger 24 and initiate the charging of the power source. A light source 36, such as a light emitting diode (LED), acts as a means for indicating when the power source is charged for the next weld.

The welding gun is held against the work piece so that ground studs 20 make positive contact so as to provide an electrical discharge path to the work piece. When trigger 24 is squeezed, piston 28 is pulled down, releasing stud chuck 14 which slides forward until the point of stud 16 contacts the work piece. An electrical cable (not shown) enters through hole 38 in the rear of case 10 to provide the electrical power to ground plate 18 and stud chuck 14 as well as control signals to the microswitches. Contact of stud 16 with the work piece closes the electrical circuit. As the point of stud 16 is vaporized by the high current, an arc is formed between stud 16 and the work piece which creates a plasma, thereby fusing stud 16 to the work piece without using a welding flux. If used underwater, the arc is sufficient to vaporize the water and allow the weld to be completed. Again welding flux is not used.

The operation of the welding gun of FIG. 2 is similar to that of FIG. 1. Stud 16 is loaded in stud chuck 52 which is pushed back into the cocked position as shown, with trigger 58 engaging land 60 to hold stud chuck 52 in position against the spring tension. Safety switch 64 is rotated until follower arm 66 engages ramped groove 68, holding safety switch 64 in this position as shown against spring tension. The power source now charges and LED 72 lights when the stud welder is ready to initiate a weld.

While welding, the welding gun is held securely against the work piece so that ground studs 20 make positive contact so as to provide an electrical discharge path to the work piece. Trigger 58 is squeezed, releasing stud chuck 52 to move forward until stud 16 contacts the work piece. As stud chuck 52 moves forward, so does the attached microswitch box 62 with pivoted follower arm 66. Follower arm 66 moves upward as it goes up grooved ramp 68 and energizes a microswitch, which allows weld power to be applied between stud chuck 52 and ground plate 18. The electrical circuit is completed through the work piece.

When follower arm 66 moves up and out of grooved ramp 68, spring-loaded safety switch 64 returns to the safe position so that the power source cannot be recharged while the operator is loading another stud 16 for the next weld. This prevents electrical shock from the discharge of the output potential and thus operates as a safety means.

Figure 3:
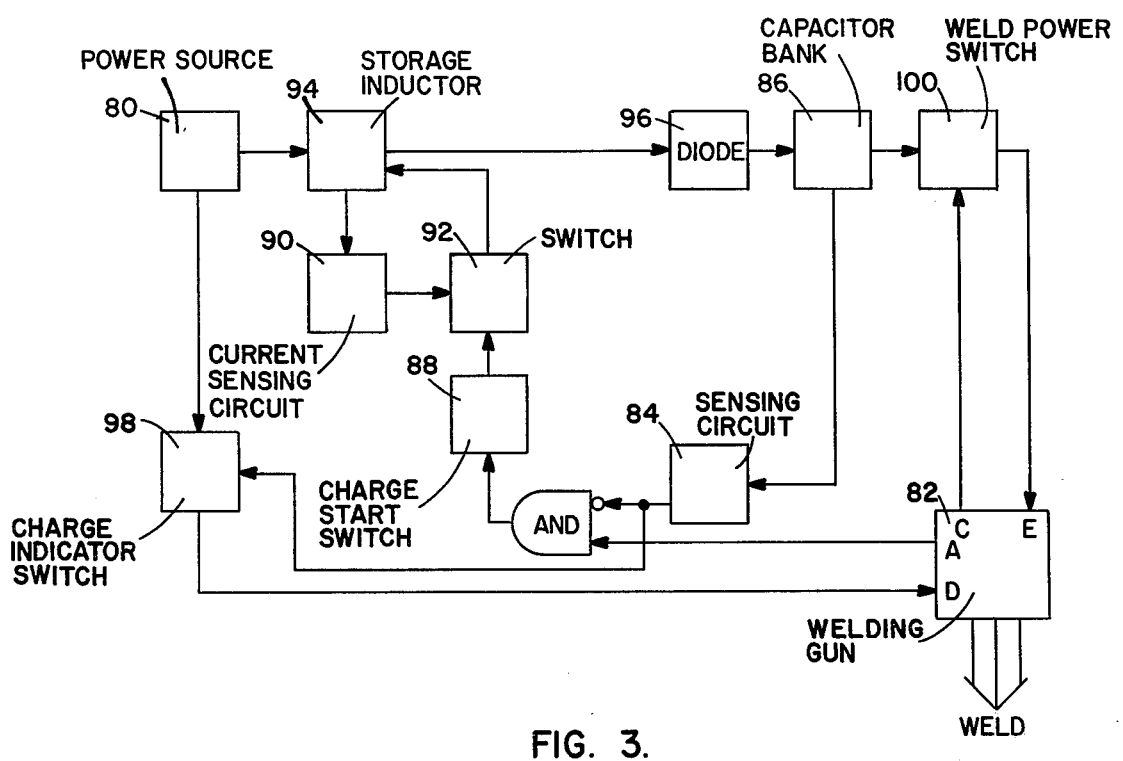
FIG. 3 is a block diagram of the electrical system for the present invention.
Figure 4:
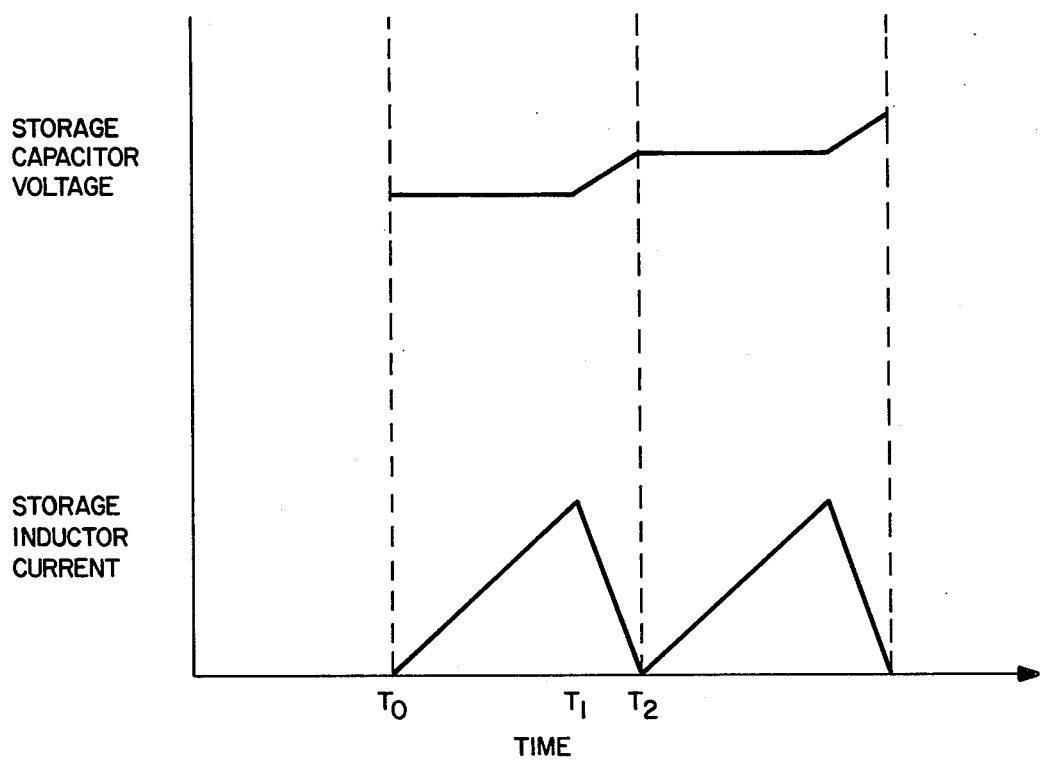
FIG. 4 is a partial graph of storage inductor current and storage capacitor voltage during the charging of the storage capacitor of the present invention.

The electrical energy transfer system of FIG. 3 uses a bank of rechargeable nickel-cadmium batteries 80 as the self-contained power supply. The charging sequence is initiated when a signal from line A of the welding gun 82 is combined by an AND gate with a signal from a voltage sensing circuit 84, which detects whether a storage capacitor 86, i.e., a bank of capacitors is fully charged. The charged storage capacitor acts as the power source for the stud welder by storing the output potential. If storage capacitor 86 is not charged, a charge start switch 88 is turned on, allowing the charge current to start. A current sensing circuit 90 turns on a second switch 92 at time $T_0$. The current linearly increases in a storage inductor 94 as shown in FIG. 4 until time $T_1$ when the current sensing circuit 90 detects the proper current and turns second switch 92 off.

The energy which is now stored in storage inductor 94 causes the voltage at the input of a diode 96 to rapidly rise to the voltage which is present on storage capacitor 86. Diode 96 then turns on from time $T_1$ to $T_2$ to conduct the energy from storage inductor 94 to storage capacitor 86, raising the voltage of storage capacitor 86 as shown in FIG. 4. Current sensing circuit 90 now starts the cycle over again. These cycles continue until sufficient energy is stored in storage capacitor 86 as sensed by voltage sensing circuit 84.

When the fully charged condition is sensed by voltage sensing circuit 84, charge start switch 88 is turned off by the AND gate, thereby stopping the charging cycles. Also, a charge indicator switch 98 is actuated, sending a signal to line D of welding gun 82 to light the LED on the gun, thereby indicating that the gun is ready to weld. The energy transfer system of FIG. 3 functions such that the energy from power supply 80 is supplied to inductor 94, which charges capacitor bank 86. The rest of the circuit acts as a circuit control means to alternately charge and discharge inductor 94.

A signal on line C from gun 82 occurs when the stud chuck moves forward a small amount after the trigger is squeezed. This signal initiates the weld power switch 100 so that when the stud strikes the work piece an instant later, storage capacitor 86 discharges through power switch 100 and line E to the gun, and thence through the stud, work piece and ground studs to complete the weld.

Figure 5:
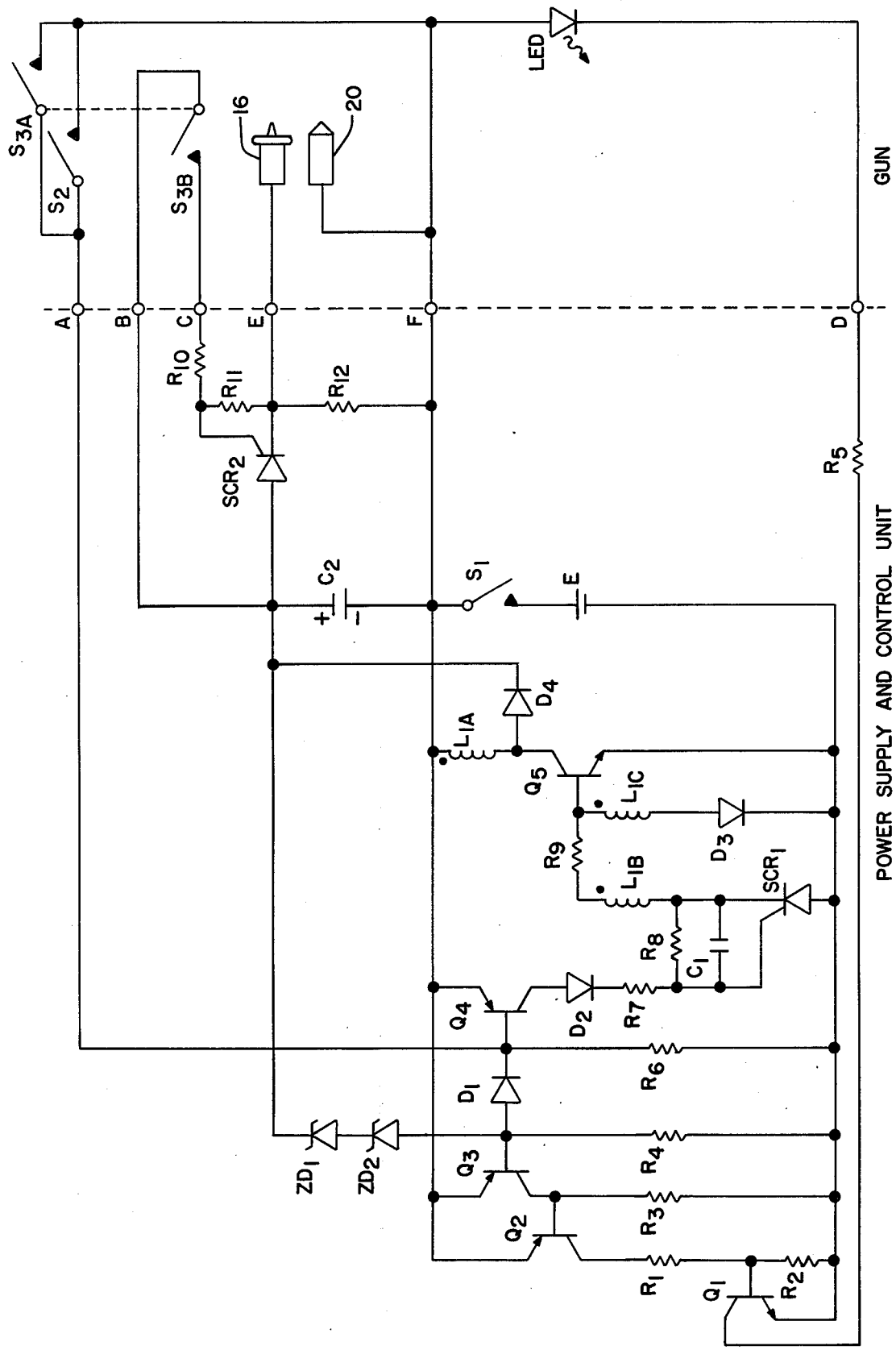
FIG. 5 is a circuit diagram of the electrical system for the present invention.

FIG. 5 presents a more detailed description of the electrical system for the stud welder and is divided into two sections—GUN and POWER SUPPLY AND CONTROL UNIT (PSCU). Master switch $S_1$, connects the nickel-cadmium batteries, E, to the electrical system and is located in the PSCU. Safety switch $S_2$ is shown in the "safety-off" position. Position switches, $S_{3A}$ and $S_{3B}$, are shown in the "cocked" position, ready to initiate the charging cycle when $S_1$ is closed. With $S_2$ and $S_{3A}$ open and with the capacitor bank, $C_2$, discharged, $S_1$ is then closed, thereby making $Q_4$ forward biased such that it conducts through $SCR_1$, $R_8$, $R_7$ and $D_2$ which in turn forward biases $Q_5$. As $Q_5$ starts to conduct, the current through $L_{1A}$ increases in a linear manner until $L_{1A}$ saturates. At saturation the current charge stops, and $Q_5$ is OFF. Magnetic coupling of $L_{1A}$, $L_{2A}$, and $L_{3A}$ is indicated on FIG. 5 by conventional subscripting and the placing of dots at specific points on the inductors.

With $Q_5$ cutoff the voltage at the anode of $D_4$ rises rapidly to the voltage present on $C_2$, and then $D_4$ allows the energy from $L_{1A}$ to be transferred to $C_2$ raising the voltage on $C_2$. When the energy transfer is complete, $Q_5$ starts to conduct again and the cycle is repeated until $C_2$ is charged to the design voltage.

The design voltage is determined by Zener diodes $ZD_1$ and $ZD_2$, and is approximately 125 volts. When $C_2$ is fully charged, $Q_4$ is OFF through $D_1$, thereby holding $Q_5$ OFF to end the charging cycles. At the same time $Q_3$ is cutoff which forward biases $Q_2$ to conduction providing forward bias for $Q_1$. With $Q_1$ conducting, current is provided to the LED to indicate to the operator that the stud welder is ready to weld. The total time for the charge cycle is approximately 10 seconds.

When the trigger is pulled, the stud chuck moves forward and closes $S_{3A}$ and $S_{3B}$. $S_{3A}$ holds $Q_4$ cutoff during the discharge of $C_2$. $S_{3B}$ switches $SCR_2$ on and allows $C_2$ to discharge through the stud 16, the workpiece and the ground studs 20. A solid state switch, $SCR_2$, is used since high currents, on the order of 3000 amps, are involved, which would render mechanical switching schemes short lived. Also, after the stud chuck moves forward, $S_2$ closes to hold $Q_4$ OFF so that $C_2$ cannot charge after the weld is complete thereby acting as a safety means while the operator is loading another stud. When the stud chuck is loaded and cocked, $S_{3A}$ and $S_{3B}$ open, which would allow $Q_4$ to conduct and start the charging cycle, except for the safety switch, $S_2$. When the stud 16 is loaded, the operator turns off the safety switch, opening $S_2$; and the weld cycle begins again. The actual weld time itself is approximately 3 msec.

If the welding gun is triggered without the stud contacting the workpiece, $C_2$ will dissipate through $SCR_2$ and $R_{12}$, as well as through the water if the welding gun is submerged, to a safe level within ten seconds. This protects the operator from electric shock. The stud moves forward in the normal manner but, failing to contact the workpiece, it is retained by the stud chuck.

The present invention is completely self-contained, relying upon the 15 volt rechargeable batteries to build the 125 volt charge voltage on the discharge capacitor bank. Since the process of transferring energy does not use any resistors to be heated by the batteries, there are no inherent loss mechanisms, resulting in high efficiency with the power supply kept as small as possible. Except for the electrical switches and connections thereto, the welding gun is freely floodable, eliminating the need for waterproof seals. The total size of the PSCU is approximately 8 inches in diameter by 24 inches in length with one connector for recharging the batteries in a shop, the connector being sealed by a waterproof cover when in operation. Thus, the entire stud welder is portable and operable by one man.

What is claimed is:

1. A portable stud welder which may be used under water, comprising:
   a hand-held stud welding gun;
   a capacitor bank connected to said hand-held stud welding gun;
   a voltage sensing circuit connected to said capacitor bank;
   an AND gate having first and second inputs, said first input being an inverting input,
   said first input connected to the output of said voltage sensing circuit,
   said second input connected to said stud welding gun;
   a charge start switch, connected to the output of said AND gate, said charge start switch configured to be turned off by said AND gate;
   a charge indicator switch connected to said voltage sensing circuit;
   a battery connected to said charge indicator switch;
   a storage inductor connected to said battery;
   a current sensing circuit connected to said storage inductor;
   a switch connected between said storage inductor and said charge start switch, said switch turned on by a signal from said charge start switch and said switch turned off by a signal from said current sensing circuit; and a diode connected between said storage inductor and said capacitor bank.

2. A portable stud welder according to claim 1 wherein said voltage sensing circuit comprises a Zener diode.

3. A portable stud welder according to claim 2 wherein said charge start switch comprises:
 a transistor having an emitter, a collector and a base;
 a diode having an anode and a cathode, said anode connected to said collector of said transistor;
 a first resistance connected to said cathode of said diode;
 a silicon-controlled-rectifier having an anode, a cathode, and a gate, said gate connected to said first resistance; and
 a resistance-capacitance network connected between said first resistance and said cathod of said silicon-controlled-rectifier.

4. A portable stud welder according to claim 3 wherein said current sensing circuit comprises:
 a first inductor;
 a resistance connected to said first inductor;
 a second inductor connected to said resistance; and
 a transistor having an emitter, a collector, and a base, said base of said transistor connected to said resistance and to said second inductor.

5. A stud welder according to claim 1 wherein said charge start switch comprises:
 a transistor having an emitter, a collector and a base;
 a diode having an anode and a cathode said anode connected to said collector of said transistor;
 a first resistance connected to said cathode of said diode;
 a silicon-controlled-rectifier having an anode, a cathode, and a gate, said gate connected to said first resistance; and
 a resistance-capacitance network connected between said first resistance and said cathode of said silicon-controlled-rectifier.

6. A stud welder according to claim 1 wherein said current sensing circuit comprises:
 a first inductor;
 a resistance connected to said first inductor;
 a second inductor connected to said resistance; and
 a transistor having an emitter, a collector, and a base, said base of said transistor connected to said resistance and to said second inductor.

7. A portable stud welder which may be used under water, comprising:
 a hand-held stud welding gun;
 a capacitor bank connected to said hand-held stud welding gun;
 a Zener diode having an anode and a cathode, said cathode of said Zener diode connected to said capacitor bank;
 an AND gate having first and second inputs, said first input connected to said anode of said Zener diode, said second input of said AND gate connected to said hand-held stud welding gun;
 a charge indicator switch connected to said capacitor bank;
 a battery connected to said charge start switch;
 a first transistor having an emitter, a collector, and a base, said emitter connected to the negative terminal of said battery;
 a first inductor connected to the base of said first transistor;
 a first diode connected between said first inductor and the negative terminal of said battery;
 a first resistance connected to the base of said first transistor;
 a second inductor connected to said first resistance
 a silicon-controlled-rectifier having an anode, a cathode, and a gate, said anode of said silicon-controlled-rectifier connected to the negative terminal of said battery, said cathode of said silicon-controlled-rectifier connected to said second inductor;
 a second diode having an anode and a cathode, said anode of said second diode connected to said collector of said first transistor, said cathode of said second diode connected to the positive terminal of said capacitor bank;
 a storage inductor connected between said anode of said second diode and the negative terminal of said capacitor bank;
 a second resistance connected to said gate of said silicon-controlled-rectifier;
 a resistance-capacitance network connected between said second resistance and said cathode of said silicon-controlled-rectifier;
 a third diode having an anode and a cathode, said cathode of said third diode connected to said second resistance; and
 a second transistor having an emitter, a collector, and a base, said collector of said second transistor connected to said anode of said third diode, said emitter of said second transistor connected to the negative terminal of said capacitor bank;
 a fourth diode having an anode and a cathode, said cathode of said fourth diode connected to the base of said second transistor, said anode of said fourth diode connected to said anode of said Zener diode.

* * * * *